United States Patent
Kario et al.

(10) Patent No.: US 9,593,718 B2
(45) Date of Patent: Mar. 14, 2017

(54) MULTIPOINT CONTACT BALL BEARING

(71) Applicant: NSK Ltd., Tokyo (JP)

(72) Inventors: Atsushi Kario, Kanagawa (JP); Yuuki Tsuchida, Kanagawa (JP); Susumu Tanaka, Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 14/764,562

(22) PCT Filed: Jan. 29, 2014

(86) PCT No.: PCT/JP2014/052008
§ 371 (c)(1),
(2) Date: Jul. 29, 2015

(87) PCT Pub. No.: WO2014/119631
PCT Pub. Date: Aug. 7, 2014

(65) Prior Publication Data
US 2015/0369291 A1  Dec. 24, 2015

(30) Foreign Application Priority Data
Jan. 30, 2013  (JP) ................ 2013-015000

(51) Int. Cl.
*F16C 33/58* (2006.01)
*F16C 33/64* (2006.01)
(Continued)

(52) U.S. Cl.
CPC .......... *F16C 33/585* (2013.01); *F16C 19/166* (2013.01); *F16C 33/64* (2013.01);
(Continued)

(58) Field of Classification Search
CPC .................................. F16C 19/166
See application file for complete search history.

(56) References Cited

U.S. PATENT DOCUMENTS 2,142,477 A    1/1939  Murden
3,586,194 A *  6/1971  Dechantsretter ........ B66F 9/141
                                                        414/651
(Continued)

FOREIGN PATENT DOCUMENTS

CN    201202731 Y    3/2009
JP    11-336795 A    12/1999
(Continued)

OTHER PUBLICATIONS

International Search Report from International Patent Application No. PCT/JP2014/052008, May 13, 2014.
(Continued)

*Primary Examiner* — Thomas R. Hannon
(74) *Attorney, Agent, or Firm* — Shapiro, Gabor and Rosenberger, PLLC (57) ABSTRACT

A multipoint contact ball bearing in constructed to prevent damage to rolling surfaces of the balls and to ensure durability while maintaining radial load capacity. An inner raceway has a complex curved surface including a pair of side surface sections having a generating line shape with a radius of curvature larger than 50% of the ball diameter, and an inner raceway bottom section connecting inside end edges in the width direction of the side surface sections. The inner raceway bottom section is a concave curved surface having a generating line shape with a radius of curvature less than 50% of the ball diameter. The edges of both sides in the width direction of the inner raceway bottom section and the inside end edges of the inner raceway side surface sections are smoothly continuous, and finishing is performed on the inner raceway bottom section and the inner raceway side surface sections.

6 Claims, 6 Drawing Sheets

(51) Int. Cl.
*F16C 19/16* (2006.01)
*F16C 33/32* (2006.01)

(52) U.S. Cl.
CPC .......... *F16C 33/32* (2013.01); *F16C 2240/40* (2013.01); *F16C 2240/50* (2013.01); *F16C 2240/76* (2013.01)

(56) References Cited

U.S. PATENT DOCUMENTS

| | | | | |
|---|---|---|---|---|
| 5,427,458 A * | 6/1995 | Sanchez | .................. | F16C 19/16 384/450 |
| 6,010,420 A * | 1/2000 | Niki | ........................ | F02B 67/06 384/475 |
| 6,082,906 A * | 7/2000 | Satou | ...................... | F16C 19/06 384/450 |
| 6,273,230 B1 * | 8/2001 | Nakano | .................. | F16C 19/06 192/110 B |
| 6,318,899 B1 * | 11/2001 | Boyd | .................... | F02F 7/0087 384/492 |
| 7,051,610 B2 * | 5/2006 | Stoianovici | ............. | F16H 1/163 384/45 |
| 9,360,043 B2 * | 6/2016 | Frank | .................... | F16C 19/166 |

FOREIGN PATENT DOCUMENTS

| | | |
|---|---|---|
| JP | 2001-304273 A | 10/2001 |
| JP | 2002-039190 A | 2/2002 |
| JP | 2005-188686 A | 7/2005 |
| JP | 2006-118591 A | 5/2006 |
| JP | 2007-218368 A | 8/2007 |

OTHER PUBLICATIONS

Extended European search report for European Patent Application No. 14746675.9, Sep. 15, 2016.

* cited by examiner

MULTIPOINT CONTACT BALL BEARING

TECHNICAL FIELD

The present invention relates to a multipoint contact ball bearing that is assembled in a rotation support section where radial loads and axial loads are both applied during operation.

BACKGROUND ART

Figure 5:
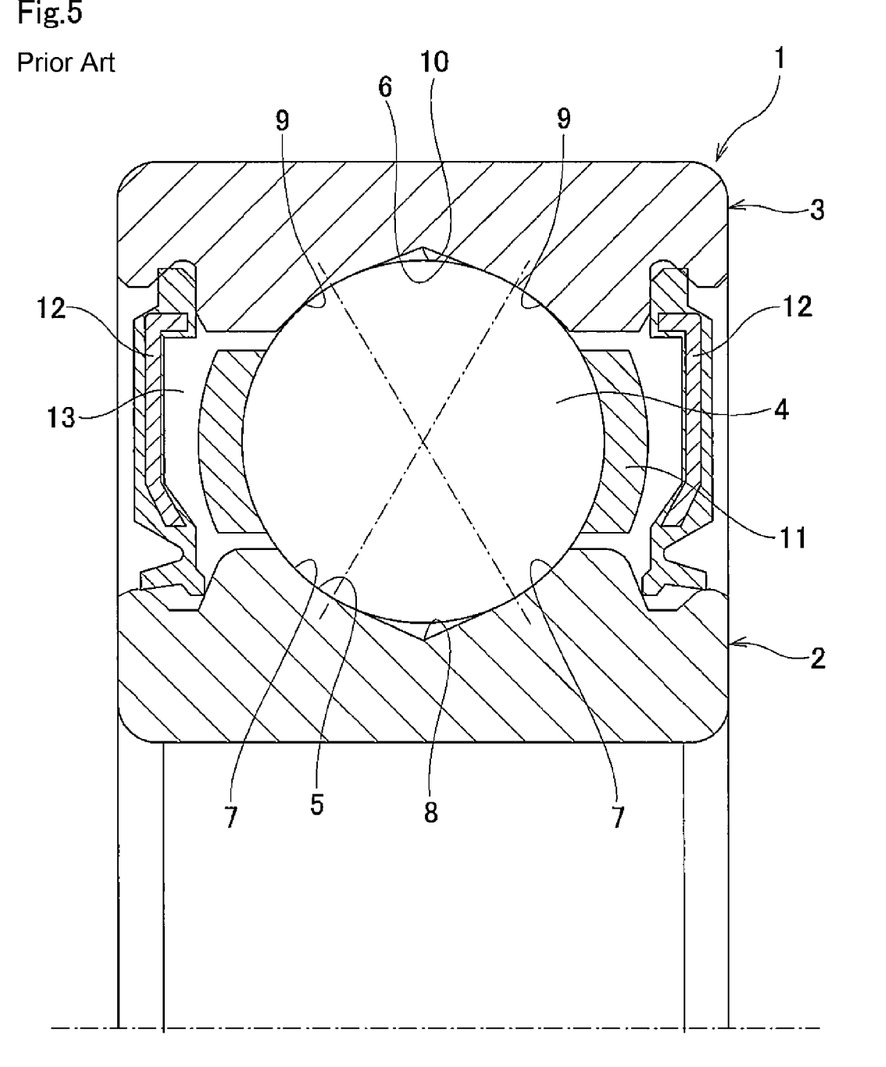
FIG. 5 is a partial cross-sectional view illustrating an example of a conventional four-point contact ball bearing.

Various kinds of rolling bearings are used in the rotation support sections of various kinds of mechanical devices. Of these rolling bearings, four-point contact ball bearings in which the rolling surfaces of each of the balls come in contact with an inner raceway and outer raceway at two points each for a total of four contact points are able to ensure a load capacity to a certain extent not only to radial loads but also to axial loads, and when compared with a typical deep-groove ball bearing, can be constructed compactly and the dynamic torque (rotation resistance) can be kept low. FIG. 5 illustrates an example of a conventional four-point contact ball bearing such as disclosed in JP 2005-188686 (A), JP 2007-218368 (A) and the like. The four-point contact ball bearing 1 comprises an inner ring 2 and outer ring 3 that are arranged concentric with each other, and plural balls 4. The inner ring 2 has an inner raceway 5 around the outer-circumferential surface thereof, and the outer ring 3 has an outer raceway 6 around the inner-circumferential surface thereof.

Both the inner raceway 5 and the outer raceway 6 have a gothic arch shaped generating line shape. In other words, the inner raceway 5 is a complex curved surface with a pair of inner raceway side surface sections 7 that have a generating line shape with a radius of curvature that is larger than 50% the diameter of the balls 4, and an inner raceway bottom section 8 that is located in the center section in the width direction of the inner raceway 5 and connects the inside end edges in the width direction of the inner raceway side surface sections 7. The outer raceway 6 also is a complex curved surface with a pair of outer raceway side surface sections 9 that have a generating line shape with a radius of curvature that is larger than 50% the diameter of the balls 4, and an outer raceway bottom section 10 that is located in the center section in the width direction of the outer raceway 6 and connects the inside end edges in the width direction of the outer raceway side surface sections 9. The balls 4 are held by a retainer 11 so as to roll freely, and are arranged so as to roll freely between the inner raceway 5 and outer raceway 6.

In the four-point contact ball bearing 1, the inner raceway 5 and outer raceway 6 and the rolling surface of each of the balls 4 come in rolling contact at two points each for a total of four points. In this kind of four-point contact ball bearing 1, an inner-diameter-side member such as a rotating shaft around which the inner ring 2 is fastened relatively rotates on the inner-diameter side of an outer-diameter-side member such as a housing inside which the outer ring 3 is fastened, and this kind of four-point contact ball bearing 1 is not only able to support radial loads that act between the inner ring 2 and outer ring 3, but is also able to support axial loads that act between the inner ring 2 and outer ring 3.

The four-point contact ball bearing 1 illustrated in FIG. 5 takes into consideration use in a pulley for an auxiliary device for engine such as an alternator, so comprises a pair of seal rings 12 for closing off the openings on both ends of the space 13 inside the bearing where the balls 4 are located, and preventing grease that is filled inside the space 13 inside the bearing from leaking, and preventing foreign matter that is located in the external space from getting inside the space 13 inside the bearing. However, in the case of placing the four-point contact ball bearing 1 inside a housing of an automobile transmission, the seal rings may be omitted, and flow of lubrication oil that flows in the space inside the bearing may be regulated by providing a non-contact type shield ring.

Figure 6:
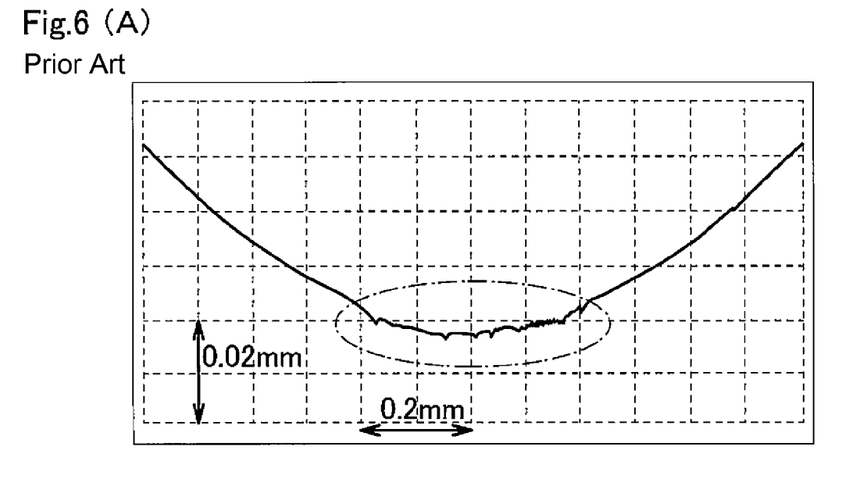
FIG. 6A is a graph illustrating a cross-sectional view of an inner raceway bottom section of the four-point contact ball bearing in FIG. 5.
FIG. 6B is a graph illustrating a roughness curve of the center section in FIG. 6A.

In the four-point contact ball bearing 1, the portions of the pair of inner raceway side surfaces sections 7 and the pair of outer raceway side surface sections 9 that come in contact with the rolling surfaces of the balls 4 during the normal operating state are processed and finished by super finishing and have smooth surfaces. On the other hand, finishing is not performed for the inner raceway bottom section 8, the outer raceway bottom section 10, the portions of the pair of inner raceway side surface sections 9 that are near the inner raceway bottom section 8, and the portions of the pair of outer raceway side surface sections 7 that are near the outer raceway bottom section 10. Therefore, as illustrated in FIG. 6, the surfaces of the inner raceway bottom section 8, outer raceway bottom section 10 and portions near these sections are rougher than the portions of the pair of inner raceway side surface sections 7 and outer raceway side surface sections 9 that come in contact with the rolling surfaces of the balls 4 during the normal operating state. The reason for this is that, as illustrated in FIG. 5, the inner raceway bottom section 8 and the outer raceway bottom section 10 are angled sections having large curvature (small radius of curvature), or relief grooves are formed, so it is difficult to bring a finishing grindstone into contact with these portions.

When the four-point contact ball bearing 1 is used in the rotation support section of a pulley for auxiliary device for engine, the radial loads that are applied to the four-point contact ball bearing 1 are limited, and the rolling surfaces of the balls 4 do not come in contact with the inner raceway bottom section 8, outer raceway bottom section 10 and the portions near these sections, so no particular problems occur even when finishing is not performed for these portions.

However, when the four-point contact ball bearing 1 is assembled in the rotation support section of an automobile drive system such as a power transmission shaft inside a transmission, there is a possibility that problems may occur from the aspect of maintaining durability of the ball bearing. For example, force in the radial direction is applied to the four-point contact ball bearing 1 from the power transmission shaft inside a transmission due to a gear reaction force that occurs in the engaging section of the power transmission gear. The size of the radial force due to this kind of gear reaction force does not become large when a vehicle is traveling at constant speed, however, when the vehicle accelerates suddenly, or when a large engine brake is obtained in a low gear during high-speed operation, the force becomes considerably large.

In this case, there is a possibility, even if for only a short period of time, that the rolling surfaces of the balls 4 will come in contact with the unfinished rough surfaces of the inner raceway bottom section 8, outer raceway bottom section 10 and the portions near these sections, or when relief grooves are formed, there is a possibility that the rolling surfaces of the balls 4 will have so-called edge contact with the edges of the relief grooves. When the rolling surfaces of the balls 4 come in contact with the rough surfaces or the edges of the relief grooves, the rolling surfaces of the balls 4 will become damaged and the rolling fatigue life of the four-point contact ball bearing will be shortened. Particularly, in the inner raceway 5 having a convex arc shape in the circumferential direction, the surface pressure is higher at the areas of contact with the rolling surfaces of the balls 4 than in the outer raceway 6 having a concave arc shape in the circumferential direction, so when the balls 4 coming in contact with the inner raceway bottom section 8 or portions near that section, it becomes even easier for the rolling surfaces of the balls 4 to become damaged.

JP 2002-039190 (A) discloses performing super finishing up to the bottom section of this raceway surface in order to suppress a decrease in the durability of a four-point contact ball bearing due to a cause such as this, with the generating line shape of the raceway surface being an elliptical shape, a parabolic shape or a hyperbolic shape. However, in the case of this construction, the contact angle of the balls becomes large, the radial load capacity of the four-point contact ball bearing becomes low, and when an axial load is applied, it becomes easy for the rolling surfaces of the balls to ride up on the shoulder section of the raceway surface. Therefore, with this construction, in uses in which large radial loads and axial loads are applied, it is not always possible to sufficiently maintain the durability of a four-point contact ball bearing.

JP 2006-118591 (A) discloses construction in which the shapes of the inner raceway and outer raceway are asymmetrical, and that is capable of supporting large axial loads, however, it is not possible to suppress a decrease in durability of a four-point contact ball bearing due to causes such as described above.

RELATED LITERATURE

Patent Literature

[Patent Literature 1] JP 2005-188686 (A)
[Patent Literature 2] JP 2007-218368 (A)
[Patent Literature 3] JP 2002-039190 (A)
[Patent Literature 4] JP 2006-118591 (A)

SUMMARY OF INVENTION

Problem to be Solved by Invention

In consideration of the situation described above, the object of the present invention is to provide a multipoint contact ball bearing that is capable of preventing damage to the rolling surfaces of the balls even when a large radial load acts and the rolling surfaces of the balls come in contact with the inner raceway bottom section and portions near that section, and suppressing a decrease in the durability of the ball bearing while maintaining the radial load capacity.

Means for Solving Problems

The multipoint contact ball bearing of the present invention has an inner ring, an outer ring and plural balls. The inner ring has an inner raceway around an outer-circumferential surface of the inner ring. The inner raceway is constructed by a complex curved surface that has a pair of inner raceway side surface sections that have a generating line shape with a radius of curvature that is larger than 50% the diameter of the balls, and preferably 51% to 55% the diameter of the balls, and an inner raceway bottom section that connects the edges on the inside ends in the width direction of the pair of inner raceway side surface sections. Moreover, the outer ring has an outer raceway around an inner-circumferential surface of the outer ring. Furthermore, the balls are rotatably provided between the outer raceway and the inner raceway, and the rolling surface of each of the balls comes in contact with the inner raceway at two points.

Particularly, in the multipoint contact ball bearing of the present invention, the inner raceway bottom section is constructed by a concave curved surface that has a generating line shape with a radius of curvature that is less than 50% the diameter of the balls. The edges on both sides in the width direction of the inner raceway bottom section are smoothly continuous with the edges on the inside ends in the width direction of the pair of inner raceway side surface sections, and finishing is also performed for the inner raceway bottom section in addition to the pair of inner raceway side surface sections. The radius of curvature of the generating line shape of the inner raceway bottom section is preferably 39% to 48% the diameter of the balls.

In the multipoint contact ball bearing of the present invention, preferably the outer raceway is also constructed by a complex curved surface that has a pair of outer raceway side surface sections having a generating line shape with a radius of curvature that is larger than 50% the diameter of the balls, and preferably 51% to 55% the diameter of the balls, and an outer raceway bottom section that connects the edges on the inside ends in the width direction of the pair of outer raceway side surface sections. In this case, the rolling surface of each of the balls comes in contact with the outer raceway at two points.

Of the multipoint contact ball bearings of the present invention, a four-point contact ball bearing, in which the rolling surface of each of the balls comes in contact at two points each with the inner raceway and outer raceway for a total of four points, the outer raceway bottom section is also constructed by a concave curved surface that has a generating line shape with a radius of curvature that is less than 50% the diameter of the balls. The edges on both sides in the width direction of the outer raceway bottom section are smoothly continuous with the edges on the inside ends in the width direction of the pair of outer raceway side surface sections, and finishing is also performed for the outer raceway bottom section in addition to the pair of inner raceway side surface sections. The radius of curvature of the generating line shape of the outer raceway bottom section is preferably 39% to 48% the diameter of the balls.

Moreover, in the case of embodying the present invention, the dimensions of the inner ring, the outer ring, the balls and the components of these members are regulated from the aspect of preventing damage to the rolling surfaces of the balls while maintaining the necessary radial load capacity and axial load capacity. For example, in the case of a four-point contact ball bearing, preferably the contact angle of the balls is 20° to 30°. Also, preferably, the width dimension of the inner raceway bottom section is 1 mm to 2 mm. For example, in the case of a four-point contact ball bearing that is used in a transmission, the diameter of the balls is about 4 mm to 40 mm.

The multipoint contact ball bearing that is the object of the present invention includes three-point contact ball bearings in which the rolling surfaces of the balls come in contact with the inner raceway at two points and the outer raceway at one point, and four-point contact ball bearings in which the rolling surfaces of the balls come in contact with the inner raceway and outer raceway at two points each for a total of four points, however, three-point contact ball bearings in which the rolling surfaces of the balls coming in contact with the inner raceway at one point and the outer raceway at two points are not an object of the present invention.

Effect of Invention

With the multipoint contact ball bearing of the present invention, it is possible to prevent damage to the rolling surfaces of the balls while maintaining the radial load capacity even when large radial loads act and the rolling surfaces of the balls come in contact with the inner raceway bottom section, so it is also possible to suppress a decrease in the durability of the ball bearing. In other words, in the present invention, the inner raceway is constructed so that the pair of inner raceway side surface sections having a generating line shape with a radius of curvature that is larger than 50% the diameter of the balls, and the inner raceway bottom section having a generating line shape that is less than 50% the diameter of the balls are smoothly continuous. Therefore, the generating line shape (radius of curvature and position of the center of curvature) of the pair of inner raceway side surface sections can be made to be the same as in the conventional construction illustrated in FIG. 5, so it is possible to make the contact angle of the balls a proper value, and it is possible to maintain the load capacity the same as in the conventional construction for both radial loads and axial loads.

In the multipoint contact ball bearing of the present invention, the inner raceway bottom section is constructed by a concave curved surface having a generating line shape with a radius of curvature that is less than 50% the diameter of the balls, so it is possible to bring a finishing grindstone in contact with this inner raceway bottom section as well and perform finishing of the inner raceway bottom section. Therefore, it is possible to prevent damage to the rolling surfaces of the balls even when large radial loads act and the rolling surfaces of the balls come in contact with the inner raceway bottom section. As a result, with the multipoint contact ball bearing of the present invention, it is possible to maintain the rolling fatigue life of the rolling surfaces of the balls, the inner raceway and the outer raceway, and thus it is possible to improve the durability of the ball bearing.

Particularly, by regulating the radius of curvature of the generating line shape of the inner raceway bottom section to be within the range of 39% to 48% the diameter of the balls, it is possible to make the contact state between the rolling surfaces of the balls and the inner raceway bottom section suitable even when a large radial load is applied and the inner ring elastically deforms.

MODES FOR CARRYING OUT INVENTION

FIG. 1 to FIG. 4B illustrate an example of an embodiment of the present invention. The four-point contact ball bearing 1$a$ of this example takes into consideration being used for rotatably supporting a power transmission shaft of an automobile transmission inside a housing, and has a shape in which the cross-sectional height H is larger than the cross-sectional width (W<H) so that the ball bearing can be placed in a limited space, and so that sufficient load capacity can be maintained for radial loads. However, the present invention is not limited to the construction of this example, and can be widely applied to three-point contact ball bearings in which the rolling surfaces of the balls come in contact with the inner raceway at two points and the outer raceway at one point, or four-point contact ball bearings in which the rolling surfaces of balls come in contact with the inner raceway and outer raceway at two points each for a total of four-points, these ball bearing being assembled in a rotation support portion to which axial loads are also applied in addition to radial loads.

Figure 1:
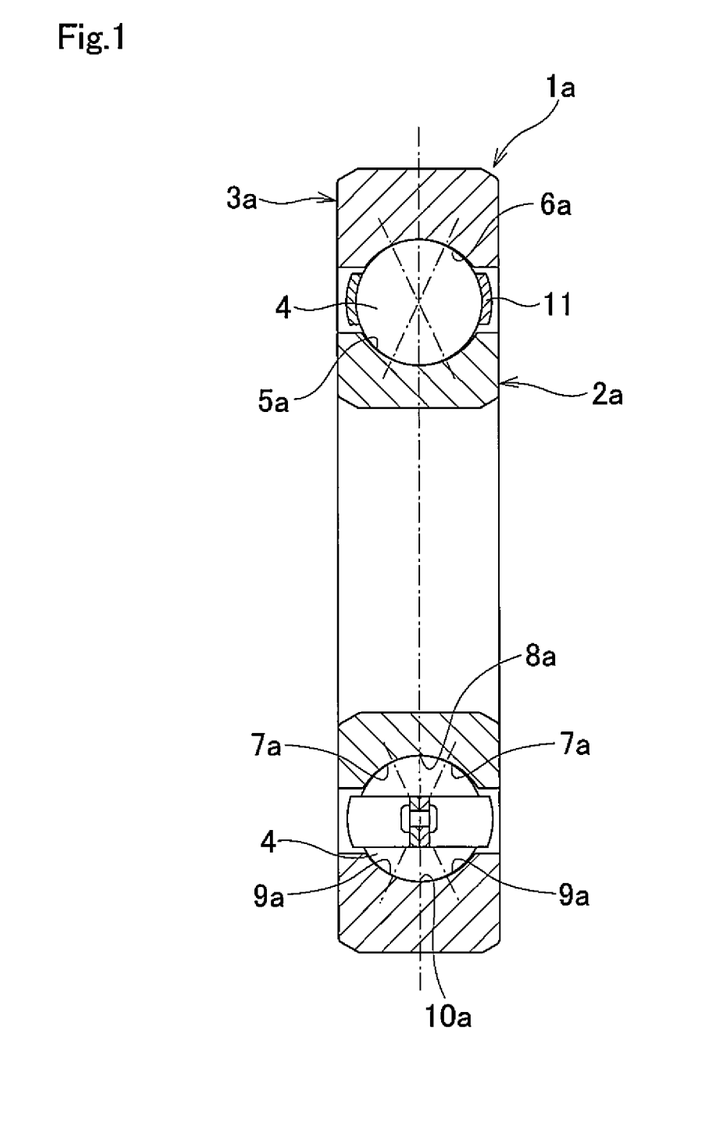
FIG. 1 is a cross-sectional view of an example of a four-point contact ball bearing of an embodiment of the present invention.
Figure 2:
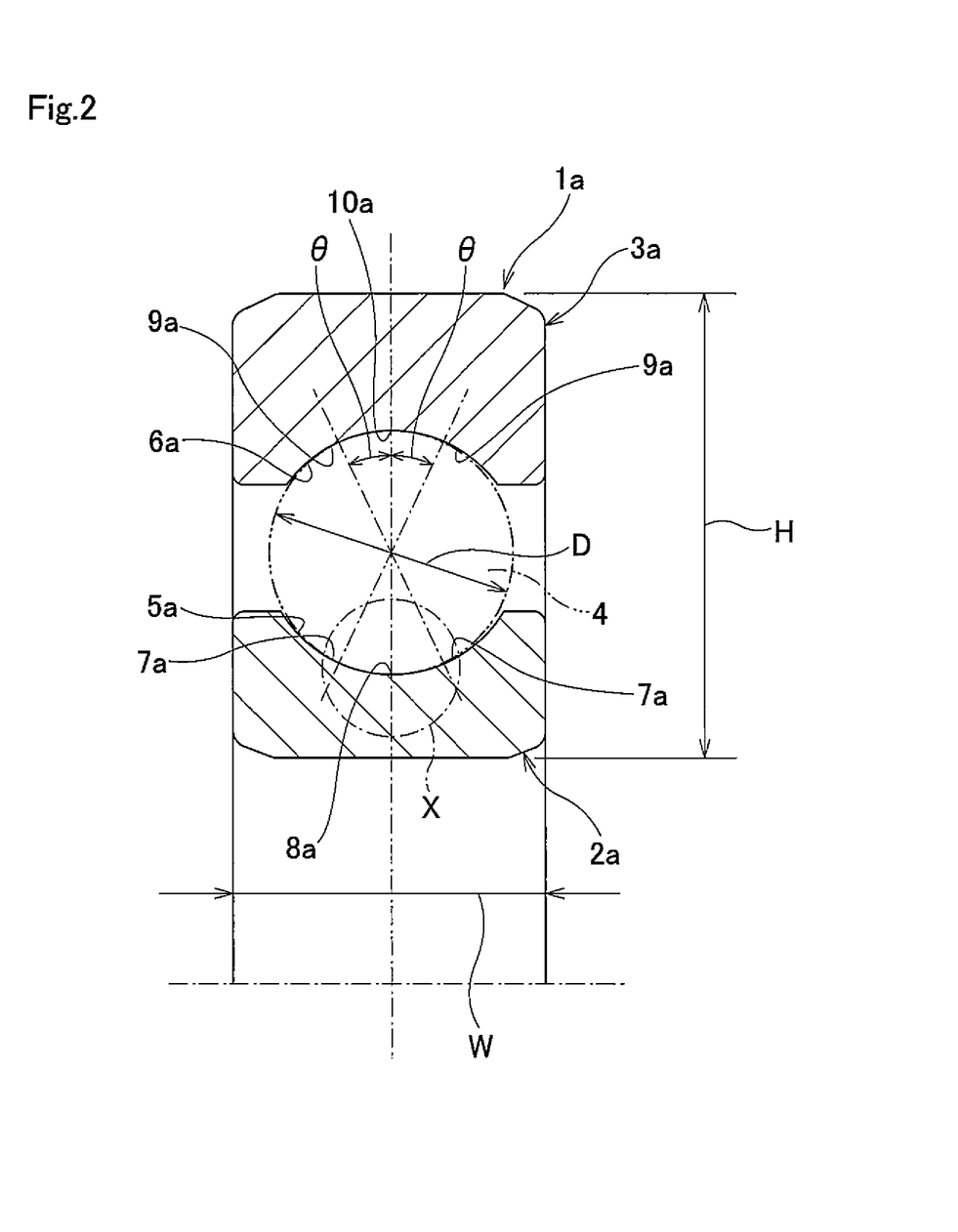
FIG. 2 is an enlarged cross-sectional view corresponding to the top portion of FIG. 1, and illustrates an inner ring and outer ring that have been removed from the four-point contact ball bearing in FIG. 1.
Figure 3:
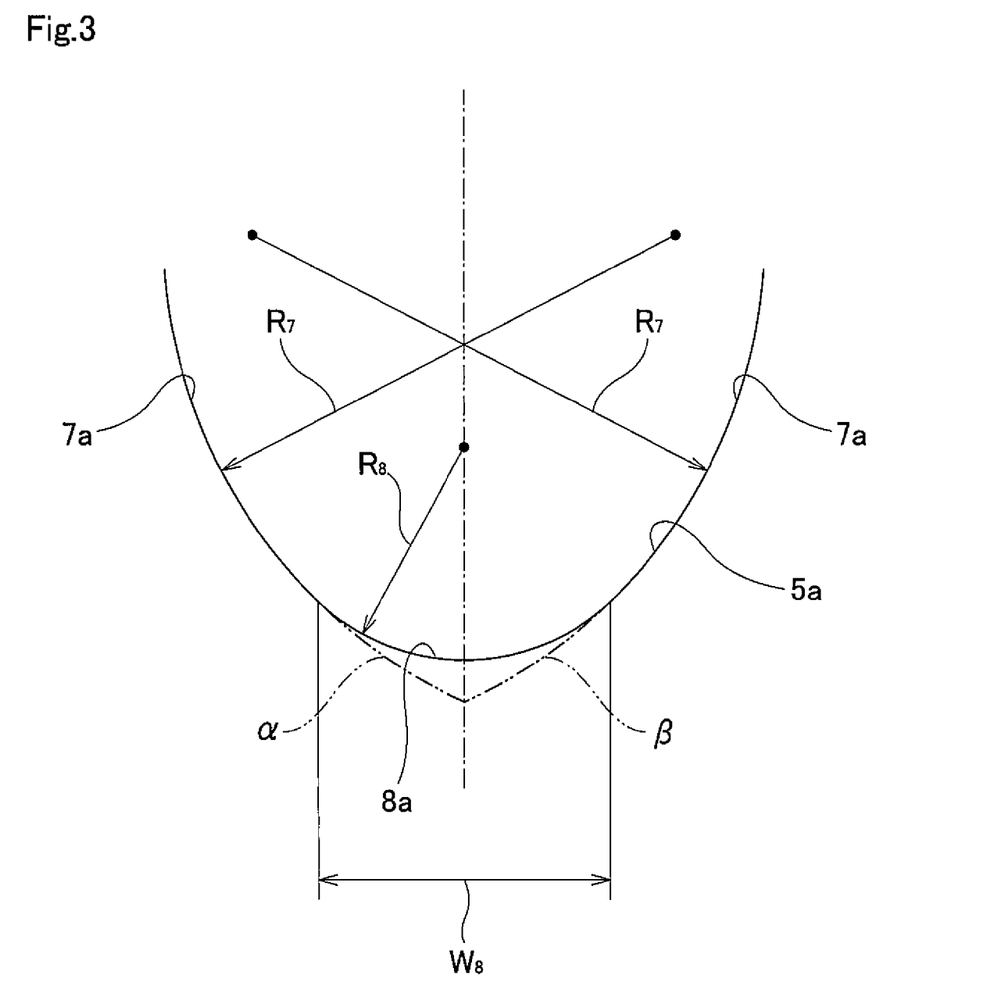
FIG. 3 is a schematic view corresponding to part X in FIG. 2, and is for explaining the shape of the generating line of the inner raceway of the inner ring in the four-point contact ball bearing in FIG. 1.
Figure 4:
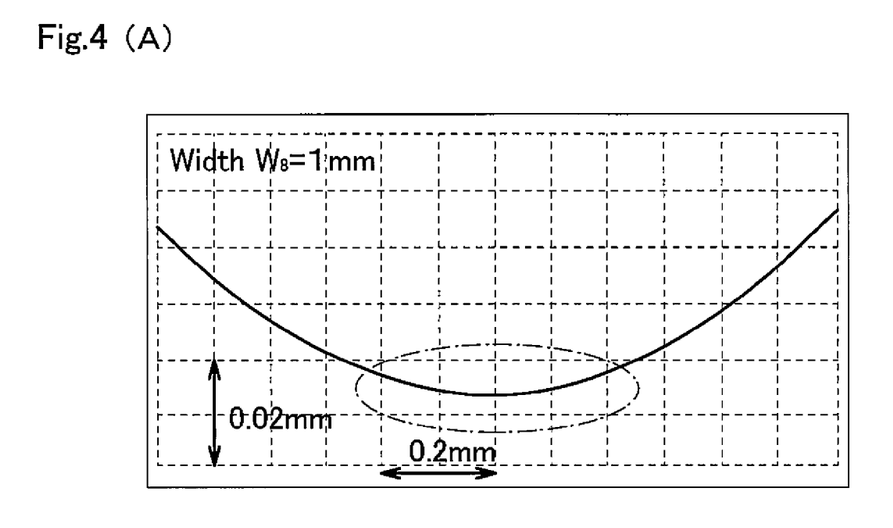
FIG. 4A is a graph illustrating a cross-sectional shape of an inner raceway bottom section corresponding to the bottom part of FIG. 3.
FIG. 4B is a graph illustrating a roughness curve of the center section in FIG. 4A.

The four-point contact ball bearing 1$a$ comprises an inner ring 2$a$ and an outer ring 3$a$ that are arranged concentric with each other, and plural balls 4 that are arranged between the inner ring 2$a$ and the outer ring 3$a$. The inner ring 2$a$ has an inner raceway 5$a$ around the outer-circumferential surface thereof. The inner raceway 5$a$ is a complex surface that comprises a pair of inner raceway side surface sections 7$a$, and an inner raceway bottom section 8$a$ that connects the edges of the inside ends in the width direction of these inner raceway side surface sections 7$a$, and is located in the center section in the width direction of the inner raceway 5$a$. The radius of curvature $R_7$ of the generating line shape of the pair of inner raceway side surface sections 7$a$ is regulated so as to be 51% to 55% the diameter D of the balls 4 [$R_7$=(0.51 to 0.55) D]. By making the radius of curvature of at least the generating line shape of the inner raceway side surface sections 7$a$, and furthermore making the radius of curvature of the generating line shape of the outer raceway side surface sections 9$a$ 51% to 55% the diameter of the balls 4, it is possible to suitably regulate the size of the contact ellipse at the areas of rolling contact between the inner raceway side surface sections 7$a$ and outer raceway side surface sections 9$a$ and the rolling surfaces of the balls 4. Therefore, it is possible to maintain the durability of the multipoint contact ball bearing while keeping the dynamic torque low.

On the other hand, the radius of curvature $R_8$ of the inner raceway bottom section 8$a$ is less than 50% the diameter D of the balls 4. Preferably, the radius of curvature $R_8$ is regulated so as to be 39% to 48% the diameter D of the balls 4 [$R_8$=(0.39 to 0.48) D], and more preferably, 44% to 48% the diameter D of the balls 4 [$R_8$=(0.44 to 0.48) D]. Moreover, the inside ends in the width direction of the generating line shape of the pair of inner raceway side surface sections 7$a$ and both ends in the width direction of the generating line shape of the inner raceway bottom section 8$a$ are smoothly continuous with each other in the tangential direction. Furthermore, finishing by super finishing is performed for not only the pair of inner raceway side surface sections 7a of the inner raceway 5a, but also the inner raceway bottom section 8a. As a result, as illustrated in FIGS. 4A and 4B, the roughness of the pair of inner raceway side surface sections 7a and the inner raceway bottom section 8a is made sufficiently small over the entire area, and of the inner raceway 5a that includes the inner raceway bottom section 8a, the portions where there is a possibility of contact with the rolling surfaces of the balls 4 are smooth. The width $W_8$ of the inner raceway bottom section 8a is regulated so as to be 1 mm to 2 mm when the diameter of the balls 4 is 4 mm to 40 mm. In other words, when the radius of curvature $R_8$ of the inner raceway bottom section 8a is 39% to 48% the diameter D of the balls 4, the width $W_8$ of the inner raceway bottom section 8a becomes 5% to 35% the diameter D of the balls 4. By regulating the width $W_8$ of the inner raceway bottom section 8a in this way so as to be 1 mm to 2 mm, a rise in surface pressure in the inner raceway bottom section 8a is suppressed, and better durability of the multi-point contact ball bearing is maintained.

Moreover, the outer ring 3a has an outer raceway 6a around the inner-circumferential surface thereof. In regard to the axis of rotation of the balls 4, the outer raceway 6a has a shape that is nearly symmetrical with the inner raceway 5a. In other words, the outer raceway 6a is a complex curved surface that comprises a pair of outer raceway side surface sections 9a, and an outer raceway bottom section 10a that connects the edges of the inside ends in the width direction of the outer raceway side surface sections 9a and is located in the center section in the width direction of the outer raceway 6a. The radius of curvature $R_9$ of the generating line shape of the pair of outer raceway side surface sections 9a is the same as or a little larger than the radius of curvature $R_7$ of the pair of inner raceway side surface sections 7a. On the other hand, the radius of curvature of the generating line shape of the outer raceway bottom section 10a is the same as the radius of curvature $R_8$ of the inner raceway bottom section 8a. In the case of the outer raceway 6a as well, the inside ends in the width direction of the generating line of the pair of outer raceway side surface sections 9a and both ends in the width direction of the generating line of the outer raceway bottom section 10a are smoothly continuous with each other in the tangential direction. Furthermore, a finishing process by super finishing is performed for not only the pair of outer raceway side surface sections 9a of the outer raceway 6a, but also for the outer raceway bottom section 10a. By forming the outer raceway 6a into a shape that is the same as the inner raceway 5a as in this example, it is possible in a four-point contact ball bearing having construction that is capable of supporting large axial load to maintain the rolling fatigue life of the outer raceway 6a, and to further improve the durability thereof. However, as long as the construction of the inner raceway 5a of the present invention is used, four-point contact ball bearings that employ a conventional ring 3 instead of the outer ring 3a, and three-point contact ball bearings in which an outer ring that comes in contact with the rolling surfaces of the balls 4 at one point on the outer raceway is used instead of the outer ring 3a are also within the range of the present invention.

The balls 4 are uniformly arranged in the circumferential direction, and being held by a retainer 11, are provided between the inner raceway 5a and outer raceway 6a so as to roll freely. In this state, in this example, the inner raceway 5a and outer raceway 6a and the rolling surface of each ball 4 come in contact at two points each for a total of four points. Moreover, by regulating the centers of the radii of curvature $R_7$ and $R_9$ together with the radius of curvature $R_7$ of the pair of inner raceway side surface sections 7a and the radius of curvature $R_9$ of the pair of outer raceway side surface sections 9a, the contact angle θ of the balls 4 becomes 20 to 30 degrees, which is a preferred value from the aspect of maintaining the radial load capacity and axial load capacity of the four-point contact ball bearing 1a. Therefore, for both radial loads and axial loads, load capacities that are the same as those of the conventional construction are maintained.

In the case of the four-point contact ball bearing 1a of this example, the shape and dimensions of the pair of inner raceway side surface sections 7a of the inner raceway 5a and the pair of outer raceway side surface sections 9a of the outer raceway 6a are the same as the shape of the inner raceway side surface sections 7 and outer raceway side surface sections 9 of the conventional construction illustrated in FIG. 5. However, in the case of the four-point contact ball bearing of this example, an inner raceway bottom section 8a and an outer raceway bottom section 10a, which have radii of curvature $R_7$, $R_8$ of the respective generating line shapes that are less than 50%, and preferably 39% to 48% the diameter D of the balls 4, are formed in the portion of the inner raceway 5a that is between the inside edges of the pair of inner raceway side surface sections 7a, and the portion of the outer raceway between the inside edges of the outer raceway side surface sections 9a. In other words, the bottom sections of the inner raceway 5 and outer raceway 6 of the conventional construction, as indicated by the chain lines a, 6 in FIG. 3, have a large V groove shape in which the ratio of the depth dimension with respect to the width dimension is large, however, in the case of the construction of this example, an inner raceway bottom section 8a and an outer raceway bottom section 10a in which the ratio of the depth dimension with respect to the width dimension is small are provided in the bottom sections of the inner raceway 5a and the outer raceway 6a. By regulating at least the radius of curvature $R_8$ of the generating line shape of the inner raceway bottom section 8a to be 39% to 48% of the diameter D of the balls 4, it is possible to maintain the contact surface area between the rolling surfaces of the balls 4 and the inner raceway bottom section 8a and keep the contact surface pressure low when a large radial load is applied and the inner ring 2a becomes elastically deformed. Moreover, with the construction of this example, the thickness (dimension in the radial direction) of the inner ring 2a and the outer ring 3a in the portions of the inner raceway bottom section 8a and the outer raceway bottom section 10a is larger than in the conventional construction, so the rigidity of the inner ring 2a and the outer ring 3a is high. Therefore, it is possible to suppress elastic deformation of the inner ring 2a and outer ring 3a when a radial load or an axial load is applied.

Moreover, by providing an inner raceway bottom section 8a and outer raceway bottom section 10a having a small ratio of depth dimension with respect to width dimension, it becomes possible to bring a grindstone for super finishing into contact with the inner raceway bottom section 8a and outer raceway bottom section 10a. Therefore, in this example, finishing is performed for the entire portions of the inner raceway 5a and outer raceway 6a, including the inner raceway bottom section 8a and outer raceway bottom section 10a, that the rolling surfaces of the balls 4 are able to come in contact with, and together with making both the inner raceway bottom section 8a and outer raceway bottom section 10a smooth surfaces, the connecting section between the inner raceway side surface sections 7a and the inner raceway bottom section 8a and the connecting section between the outer raceway side surface sections 9a and the outer raceway bottom section 10a are shaped with no corner sections. Therefore, the contact state between the rolling surfaces of the balls 4 and the inner raceway bottom section 8a and outer raceway bottom section 10a when a large radial load is applied and the inner ring 2a is elastically deformed becomes proper, and damage to the rolling surfaces of the balls 4 is prevented. Furthermore, the inner raceway side surface sections 7a and outer raceway side surface sections 9a that are normally in rolling contact with the rolling surfaces of the balls 4 are prevented from becoming damaged, and it is possible to suppress a decrease in the durability of the four-point contact ball bearing 1a.

EXAMPLE

A durability test that was performed in order to confirm the effect of the present invention will be explained. In this durability test, two samples (Example 1, Example 2) that were within the technical scope of the present invention were prepared. Example 1 and Example 2 of these samples were such that the inner raceway bottom section smoothly connected the inner raceway side surface sections, as illustrated by the solid line in FIG. 3, and super finishing was performed for the entire area of the inner raceway side surface sections and inner raceway bottom section. The width dimension of the inner raceway bottom sections of Example 1 and Example 2 were different. Moreover, as illustrated by the chain line in FIG. 3, in a Comparative Example 1, the inner raceway side surface sections are not smoothly connected to each other, and super finishing was not performed for the V groove-shaped bottom section having a large ratio of depth dimension with respect to width dimension. For these three different samples, varying loads in the radial direction were applied to each of the samples under the same conditions with the inner ring rotating and the outer ring stopped, and the amount of time it took for peeling to occur in some portion, and vibration due to operation to suddenly become large, or in other words the amount of time until the rolling fatigue life was reached was measured. The parameters and testing condition of Example 1, Example 2 and Comparative Example 1 will be presented in detail below.

[Parameters]
four-point contact ball bearing:
  Inner diameter: 20 mm
  Outer diameter: 60 mm
  Cross-sectional width (W): 9 mm
  Cross-sectional height (H): 20 mm
  Ball diameter (D): 6.35 mm
  Steel type: SUJ2
  Ratio of the radius of curvature of the generating line shape of the inner raceway side surface sections and outer raceway side surface sections with respect to the ball diameter (D): 52%
  Contact angle ($\theta$): 25°
  Shape of the inner raceway bottom section and outer raceway bottom section in Example 1 and Example 2: Shape such that the inside edges of the inner raceway side surface sections and the inside edges of the outer raceway side surface sections are smoothly connected together
  Ratio of the radius of curvature of the generating line shape of the inner raceway bottom section of Example 1 and Example 2 with respect to the ball diameter (D): 46.6%
  Length in the width direction of the inner raceway bottom section and outer raceway bottom section of Example 1: 3 mm
  Length in the width direction of the inner raceway bottom section and outer raceway bottom section of Example 2: 1 mm
  Shape of the inner raceway bottom section and outer raceway bottom section of Comparative Example 1: V groove shape
  Finishing of Example 1 and Example 2: Super finishing of the entire area of the inner raceway side surface sections, inner raceway bottom section, outer raceway side surface sections and outer raceway bottom section
  Finishing of Comparative Example 1: Super finishing of the inner raceway side surface sections and outer raceway side surface sections, no finishing of the inner raceway bottom section and portions of the inner raceway side surface sections near the inner raceway bottom section, and no finishing of the outer raceway bottom section and portions of the outer raceway side surface sections near the outer raceway bottom section
  Lubrication oil: ATF

[Test Conditions]
  Varying load in the radial direction: 9.5 kN (Max)
  Inner ring rpm: 4000 rpm
  Rolling fatigue life: 100 hours (Example 1)
  100 hours (Example 2)
  15 hours (Comparative Example 1)

As a result of this durability test, the rolling fatigue life of both Example 1 and Example 2 was confirmed to be 6 times or greater than the rolling fatigue life of Comparative Example 1. Moreover, in Comparative Example 1, pealing occurred in the inner raceway bottom section. As is clear from these test results, with the present invention, it is possible to improve the durability compared with conventional construction while keeping the dynamic torque, load capacity and basic performance required for a four-point contact ball bearing that same as that of the conventional construction.

INDUSTRIAL APPLICABILITY

From the aspect of both maintaining load capacity for both radial loads and axial loads and improving durability, the present invention can most effectively be applied to a four-point contact type of ball bearing in which the rolling surface of each of the balls comes in contact with the inner raceway and outer raceway at two points each for a total of four-points. However, the present invention can also be applied to three-point contact type ball bearings in which the rolling surface of each of the balls comes in contact with the inner raceway at two points and the outer raceway at one point.

EXPLANATION OF REFERENCE NUMBERS

1, 1a four-point contact ball bearing
2, 2a Inner ring
3, 3a Outer ring
4 Ball
5, 5a Inner raceway
6, 6a Outer raceway
7, 7a Inner raceway side surface section
8, 8a Inner raceway bottom section
9, 9a Outer raceway side surface section
10, 10a Outer raceway bottom section
11 Retainer
12 Seal ring
13 Internal bearing space

What is claimed is:

1. A multi-point contact ball bearing comprising:
an inner ring having an inner raceway around the outer-circumferential surface thereof;
an outer ring having an outer raceway around the inner-circumferential surface thereof;
plural balls that are provided between the inner raceway and the outer raceway so as to roll freely; wherein
the inner raceway is a complex curve surface that comprises a pair of inner raceway side surface sections that have a generating line shape with a radius of curvature that is 51% to 55% the diameter of the balls, and an inner raceway bottom section that connects the inside edges in the width direction of the pair of inner raceway side surface sections;
the rolling surface of each of the balls comes i contact with the inner raceway at two points;
the inner raceway bottom section comprises a concave curved surface that has a generating line shape with a radius of curvature that is 39% to 48% the diameter of the balls, and the edges on both sides in the width direction of the inner raceway bottom section are smoothly continuous with the edges on the inside ends in the width direction of the pair of inner raceway side surface sections; and
finishing is also performed for the inner raceway bottom section in addition to the pair of inner raceway side surface sections.

2. The multipoint contact ball bearing according to claim 1, wherein
the outer raceway is a complex curved surface that comprises a pair of outer raceway side surface sections that has a generating line shape with a radius of curvature this is larger than 50% the diameter of the balls, and an outer raceway bottom section connects the edges of the inside ends in the width direction of the pair of outer raceway side surface sections; and
the rolling surface of each of the balls comes in contact with the outer raceway at two points.

3. The multipoint contact ball bearing according to claim 2, wherein
the outer raceway bottom section comprises a concave curved surface that has a generating line shape with a radius of curvature that is less than 50% the diameter of the balls, and the edges on both sides in the width direction of the outer raceway bottom section are smoothly continuous with the edges on the inside ends in the width direction of the pair of outer raceway side surface sections; and
finishing is also performed for the outer raceway bottom section in addition to the pair of outer raceway side surface sections.

4. The multipoint contact ball bearing according to claim 2, wherein the contact angle of the balls is 20° to 30°.

5. The multipoint contact ball bearing according to claim 2, wherein the radius of curvature of the generating line shape of the pair of outer raceway side surface sections is 51% to 55% the diameter of the balls.

6. The multipoint contact ball bearing according to claim 2, wherein the width dimension of the inner raceway bottom section is 1 mm to 2 mm.

* * * * *